(12) United States Patent
Stewart (10) Patent No.: US 10,197,286 B2
(45) Date of Patent: Feb. 5, 2019

(54) COMBUSTION SYSTEM

(76) Inventor: Jason Joren Jens Stewart, Warkworth (NZ)

( * ) Notice: Subject to any disclaimer, the term of this patent is extended or adjusted under 35 U.S.C. 154(b) by 804 days.

(21) Appl. No.: 14/115,339

(22) PCT Filed: May 4, 2012

(86) PCT No.: PCT/NZ2012/000061
§ 371 (c)(1),
(2), (4) Date: Mar. 13, 2014

(87) PCT Pub. No.: WO2012/150868
PCT Pub. Date: Nov. 8, 2012

(65) Prior Publication Data
US 2014/0196637 A1    Jul. 17, 2014

(30) Foreign Application Priority Data
May 4, 2011  (NZ) .......................... 591085

(51) Int. Cl.
| | |
|---|---|
| *F24B 1/02* | (2006.01) |
| *F23B 90/04* | (2011.01) |
| *F23B 60/00* | (2006.01) |
| *F23G 5/02* | (2006.01) |
| *F23G 5/04* | (2006.01) |

(Continued)

(52) U.S. Cl.
CPC .............. *F24B 1/026* (2013.01); *F23B 60/00* (2013.01); *F23B 90/04* (2013.01); *F23G 5/0276* (2013.01); *F23G 5/04* (2013.01); *F23L 1/02* (2013.01); *F23L 9/02* (2013.01); *F23L 15/04* (2013.01); *F24B 1/028* (2013.01)

(58) Field of Classification Search
CPC .......... F24B 1/028; F24B 1/016; F23B 90/04; F23B 60/00; F23B 60/02; F23G 5/0276; F23L 9/02; F23L 1/02
See application file for complete search history.

(56) References Cited

U.S. PATENT DOCUMENTS

| | | |
|---|---|---|
| 4,559,882 A | 12/1985 | Dobson |
| 4,630,553 A | 12/1986 | Goetzman |

(Continued)

FOREIGN PATENT DOCUMENTS

| | | | | |
|---|---|---|---|---|
| EP | 0708298 A2 | * | 4/1996 | ............... F23L 9/04 |
| WO | WO 03/048645 | | 6/2003 | |

OTHER PUBLICATIONS

Partial English Machine Translation: EP 0708298. Accessed Apr. 2017.*

*Primary Examiner* — Jianying Atkisson
*Assistant Examiner* — Tavia Sullens
(74) *Attorney, Agent, or Firm* — Young & Thompson (57) ABSTRACT

This invention relates to a combustion system. The combustion system includes a fireplace which has a fire base, a primary combustion zone for pyrolysising and/or combusting a biomass fuel, and a secondary combustion zone for combusting gases and/or particulate matter produced from the pyrolysis and/or combustion of the biomass fuel. The combustion system also includes an exhaust flue, the exhaust flue extending to a position near to, or adjacent, the secondary combustion zone and/or the fire base. The invention may be particularly suitable for use in relation to wood burners, either by retrofitting to existing wood burners or by incorporating into new wood burners.

11 Claims, 5 Drawing Sheets

(51) Int. Cl.
 *F23L 1/02* (2006.01)
 *F23L 9/02* (2006.01)
 *F23G 5/027* (2006.01)
 *F23L 15/04* (2006.01)

(56) References Cited

U.S. PATENT DOCUMENTS

| | | |
|---|---|---|
| 4,646,712 A * | 3/1987 | Ferguson .................. F23B 5/04 |
| | | 110/203 |
| 4,672,946 A | 6/1987 | Craver |
| 4,832,000 A | 5/1989 | Lamppa |
| 4,854,298 A | 8/1989 | Craver |
| 4,856,491 A | 8/1989 | Ferguson |
| 2011/0005509 A1 | 1/2011 | Marple |

* cited by examiner

COMBUSTION SYSTEM

FIELD

This invention relates to a combustion system for use in the combustion of biomass fuels such as wood. The invention may be particularly suitable for use in relation to domestic wood burners, and for convenience only therefore, the invention will be predominantly described in relation to such use.

However, it is to be understood and appreciated that the invention may also have other applications and/or uses—for example, in relation to open fireplaces, masonry fireplaces, and furnaces. The combustion system may also have industrial applications or uses.

The prior art and possible applications of the invention, as discussed below, are therefore given by way of example only.

BACKGROUND

A problem associated with the burning of biomass fuel in general is the production of air pollutants. For example, the burning of biomass fuel (and particularly the inefficient burning of biomass fuel) may produce volatile, toxic, or other undesirable gases. Furthermore, large amounts of smoke and particulate matter may also be released into the atmosphere.

In this regard open fireplaces are particularly inefficient. That is, open fireplaces usually produce larger amounts of air pollutants, as compared to enclosed fireplaces. Furthermore, an open fireplace generally only provides heat directly in front of the fireplace, with the vast majority of the heat being lost up through the chimney or out through the rear wall of the fireplace.

The inefficiency of open fire places has been addressed to a certain extent by the use of domestic furnaces. Examples can be found in U.S. Pat. No. 4,559,882 (Dobson) and U.S. Pat. No. 4,630,553 (Goetzman).

However, whilst the problems of the inefficient burning of biomass fuel for space heating can be addressed somewhat with a furnace, the extra capital cost is not always necessary, practical, or affordable. Furthermore, furnaces tend to be used mainly in very cold climates, but not in temperate climates, and are also usually coupled to some sort of central heating, which is not always desirable.

Moreover, a further issue with furnaces is that they are usually completely closed off from view, and do not therefore provide the psychological or aesthetic benefits that are derived from lazy flame as a light source. That is, people like to see flames.

Perhaps a result, "air tight wood burners" or simply "wood burners" have become increasingly more popular over the years, and are now in widespread use. "Wood Stove" is another common term for such appliances, particularly in North America.

Wood burners generally comprise a metal firebox, into which biomass fuel may be placed and burnt, an adjustable air control or damper, and an exhaust flue. Many, if not most, wood burners also have a glass door through which the fire and/or flames may be viewed.

The combustion of biomass fuel is a complex process, and includes a range of chemical reactions. As yet, there does not appear to be a wood burner or fireplace designed for space heating that adequately incorporates the various stages of combustion in relation to each other.

These stages are drying, pyrolysis, combustion and reduction, which if done correctly produce the combustible gases carbon monoxide and hydrogen. The carbon monoxide and hydrogen can then be combusted separately during what is known as secondary combustion to yield only water and carbon dioxide (and heat). However, most wood burners lack the ability to burn or convert such gases (and their precursors such as carbon dioxide and water) due to the wood burner not being able to produce enough heat to do so (conventional wood burners usually reach maximum temperatures of between 600° C.-800° C.).

Hence, attaining a high enough temperature during secondary combustion to consume all the volatiles distilled during pyrolysis or combustion is difficult because the necessary temperature is often higher than that which can ordinarily be generated. In this regard, the temperature required to adequately consume the vast majority (if not all) of the volatiles and/or particulate matter and smoke would be a minimum of approximately 900° C., and more preferably above 1000° C.

U.S. Pat. No. 4,672,946 (Craver) describes a wood burner which has a secondary combustion means for burning the particulate matter in the flue gases. However, the temperature reached within the firebox of the Craver device is stated as being only around 540° C. (1000° F.) and the secondary combustion region only reaches up to around 760° C. (1400° F.). Hence, a disadvantage associated with Craver is that the design of the wood burner does not attain high enough temperatures to adequately consume the vast majority of gases or particulate matter. Furthermore, the wood burner described in Craver is not able to be retro-fitted to an existing wood burner or other fireplace.

In more recent times, many countries or local bodies have introduced regulations to restrict the sale of inefficient and/or polluting wood burners.

For example, in New Zealand the generally allowable standard for wood burners is a maximum of 1.0 grams of particulate matter released per kilogram of wood burned, accompanied by a minimum efficiency of 65%. However, some regions have gone further than this. For example, the Canterbury Regional Council in New Zealand (which is in the region of a weather-inversion layer) has lowered these levels to 0.6 grams of particulate matter per kilogram of wood burned. The Regulations further restrict the use of wood with a moisture content higher than 25%.

However, these Regulations are not retrospective, and hence they only have effect in relation to wood burners manufactured and sold after the Regulations came into force. Moreover, to date there have been no innovations which have enabled people to bring their older wood burners up to modern compliance levels (voluntarily or otherwise).

Two factors which usually have the most detrimental effect regarding the efficiency of, and/or the release of air pollutants from, a wood burner are to do with refueling the wood burner and when shutting down or reducing the air supply to the wood burner.

Refueling causes quenching, a situation where the introduction of fresh fuel to the fire is not supported by the heat contained within the existing fire to adequately pyrolyse the biomass. As a result, visible smoke and particulate matter are often seen exiting the top of the flue or chimney at this time. This can take a while to subside as enough heat builds up in the fire to commence the correct chemical processes required to efficiently combust the fresh fuel.

A wood burner user may wish to reduce the air supply to keep the fire burning longer and/or while they are asleep. This is known as "banking". In doing so, they generally place a full load of biomass fuel in the wood burner and shut down (or minimise) the air supply to prolong the burn time. However, the reduction in available oxygen and the corresponding detrimental effect on combustion results in more air pollutants being produced and released. Because this often results in the amount of air pollutants exceeding the minimum regulated amounts, many modern wood burner designs have denied the user the ability to shut down the air supply.

The air supply also affects the dynamics of wood burners because a greater draught causes more heat to be generated, but a greater portion of heat is lost up the flue. The higher velocity of gases also results in more particulate matter being exhausted to the atmosphere. Conversely, a lesser draught reduces the amount of particulate matter being drawn from the combustion chamber but also reduces the heat output. However it is possible in these conditions that although less heat is generated, less heat is also lost to the atmosphere as the heat has more time to radiate off before being exhausted.

Or to put it another way, greater air means greater heat, but lower efficiency, however the greater heat actually results in a cleaner burn which lowers the emissions. With a lesser air supply, the fires get greater efficiency but the lower heat increases emissions. As a result of these dynamics, there is a common saying amongst laboratory engineers which is: "You can build a hot and clean fire, and you can build an efficient fire, but you can't build both in the same fire". I believe that my combustion system, as described herein, does in fact result in both a hot and clean fire and an efficient fire.

Another approach taken by wood burner manufacturers to address problems of fire inefficiency or to reduce the release of pollutants is by employing the use of catalytic converters (either by retrofitting to existing wood burners or by incorporating them into new wood burners). However, catalytic converters are generally very expensive, and may be considered complex to operate and/or understand by many people—and this may be prohibitive to both wood burner manufacturers and end consumers. Furthermore, the installation of catalytic converters requires specialist knowledge and significant alterations to be made to the wood burner, and flue, and this can be time consuming, complex and expensive.

It may therefore be advantageous if there was available a relatively simple and/or improved combustion system, which included primary and secondary combustion zones which were able to result in more efficient combustion of biomass fuels and/or result in a lesser amount of air pollutants being released, as compared to presently available or prior art combustion systems.

It may also be of advantage if there was available a combustion system which was able to be retrofitted to existing fireplaces, such as wood burners, for example to increase their efficiency and/or to bring them up to modern compliance standards.

OBJECT

It is an object of the present invention to provide a combustion system which goes some way towards addressing one or more of the above problems or difficulties, or which at the very least provides the public with a useful choice.

DEFINITIONS

Throughout this specification unless the text requires otherwise, the word 'comprise' and variations such as 'comprising' or 'comprises' will be understood to imply the inclusion of a stated integer or step or group of integers or steps but not the exclusion of any other integer or step or group of integers or steps.

Throughout this specification, the term "biomass" or "biomass fuel" is to be understood to include reference to any type of organic-based fuel which may be used for burning in a fireplace. Examples include (but are not limited to) wood, bark, sawdust, sawdust pellets, brush, straw, logs, coal, and charcoal.

Throughout this specification, the term "wood burner" is to be understood to refer an enclosed firebox (often metal), and which (usually) has an adjustable air supply, and which is connected to a suitable exhaust flue. Other common names for a wood burner are "solid fuel burner" or "appliance. Moreover, terms such as "wood stove" or "wood burning stove" appear to be the names more commonly used in North America.

Throughout this specification, the term "fireplace" is to be understood to include any type of structure used for containing or housing a fire. Examples include (but are not limited to) wood burners, open fireplaces, masonry fireplaces and furnaces.

STATEMENTS OF INVENTION

According to one aspect of the present invention, there is provided a combustion system, said combustion system including:
a) a fireplace, said fireplace including:
  i. a fire base,
  ii. a primary combustion zone for pyrolysising and/or combusting a biomass fuel,
  iii. a secondary combustion zone for combusting gases and/or particulate matter produced from the pyrolysis and/or combustion of the biomass fuel,
b) an exhaust flue, said exhaust flue including a lower portion, and said lower portion extending to a position near to, or adjacent, said secondary combustion zone and/or said fire base.

According to another aspect of the present invention, there is provided a combustion system, substantially as described above, wherein said combustion system further includes, or results in, a charcoal/reduction layer forming below the primary combustion zone, and/or between the primary combustion zone and the secondary combustion zone, the arrangement and construction being such that the gases and/or particulate matter produced from the pyrolysis and/or combustion of the biomass fuel in the primary combustion zone have to pass over or through said charcoal/reduction layer prior to entering the secondary combustion zone and/or the lower portion of the exhaust flue.

According to another aspect of the present invention, there is provided a combustion system, substantially as described above, wherein said combustion system also includes a drying zone for drying the biomass fuel and/or removing water from the biomass fuel prior to the pyrolysis and/or combustion of the fuel.

According to another aspect of the present invention, there is provided a combustion system, substantially as described above, wherein said combustion system includes a first air supply means for supplying air to the primary combustion zone (or fireplace).

According to another aspect of the present invention, there is provided a combustion system, substantially as described above, wherein said first air supply means is an air damper.

According to another aspect of the present invention, there is provided a combustion system, substantially as described above, wherein said combustion system further includes a second air supply means for introducing super heated air into the region of the secondary combustion zone.

According to another aspect of the present invention, there is provided a combustion system, substantially as described above, wherein said second air supply means includes a secondary flue partially or wholly surrounding the lower portion of the exhaust flue.

According to an alternative aspect of the present invention, there is provided a combustion system, substantially as described above, wherein said second air supply means includes an air channel which penetrates the exhaust flue and which extends to a position near to, or adjacent, said secondary combustion zone and/or said fire base.

According to another aspect of the present invention, there is provided a combustion system, substantially as described above, wherein said fire base includes a grate.

According to another aspect of the present invention, there is provided a combustion system, substantially as described above, wherein said grate includes a plurality of hollow tubes, the arrangement and construction being such that these hollow tubes form part of the second air supply means for introducing super heated air into the region of the secondary combustion zone.

According to another aspect of the present invention, there is provided a combustion system, substantially as described above, wherein the combustion system includes insulation means for insulating the region of the secondary combustion zone.

According to another aspect of the present invention, there is provided a combustion system, substantially as described above, wherein said insulation means also serves to introduce a degree of air turbulence and/or mixing into the region of the secondary combustion zone.

According to another aspect of the present invention, there is provided a combustion system, substantially as described above, wherein said insulation means is in the form of a ceramic disc.

According to another aspect of the present invention, there is provided a combustion system, substantially as described above, wherein said fireplace is a wood burner.

According to another aspect of the present invention, there is provided a combustion system, substantially as described above, wherein said combustion system is retrofitted to an existing wood burner.

According to another aspect of the present invention, there is provided a combustion system, substantially as described above, wherein said fireplace is an open fireplace.

The combustion system may preferably include a fireplace.

The fireplace may preferably include a fire base.

The fire base may be any suitable platform or structure which may form the base of the fireplace or combustion system.

For example, if the fireplace is a masonry or open fireplace, then the fire base may be the fire pit or grate upon which the biomass fuel is placed for burning.

Alternatively, if the fireplace is a wood burner, then the firebase may be the floor or bottom of the firebox of the wood burner.

The fire base may also include a grate which is housed within (or which forms) the floor of the firebox of the wood burner. In such an embodiment, ash may collect below the grate where it may be removed, for example by opening a lower door or tray in the wood burner specifically for this purpose.

Preferably, the fireplace may include a primary combustion zone for pyrolysising and/or combusting the biomass fuel.

Preferably, the fireplace may include a secondary combustion zone for combusting gases and/or particulate matter produced from the pyrolysis and/or combustion of the biomass fuel.

Preferably, the combustion system may include an exhaust flue, with the exhaust flue including a lower portion, and with the lower portion extending to a position near to, or adjacent, the secondary combustion zone and/or the fire base.

In the case of a wood burner, the exhaust flue may preferably extend through the top of the wood burner and up through the roof or ceiling of the dwelling where the wood burner is housed.

In another embodiment, the exhaust flue may extend through the rear wall or side wall of the wood burner, and then subsequently pass up through a ceiling of the dwelling, or alternatively pass out through a side wall of the dwelling. In such embodiments, the lower portion of the exhaust flue (which passes into the firebox of the wood burner) may preferable be right-angled so that the secondary combustion zone is still formed underneath the (vertical) open end of the lower portion of the exhaust flue.

A company which manufactures many types of wood burners which utilise a rear or side flue exit is Jotul Group of Norway.

Preferably, the combustion system, when in operation, may include, or result in, a charcoal/reduction layer forming below the primary combustion zone, and/or between the primary combustion zone and the secondary combustion zone. In such an embodiment, the arrangement and construction may be such that the gases and/or particulate matter produced from the pyrolysis and/or combustion of the biomass fuel in the primary combustion zone, have to pass over or through the charcoal/reduction layer prior to entering the secondary combustion zone and/or the lower portion of the exhaust flue.

For example, in an embodiment where the fireplace is a wood burner, it may be appreciated that by extending the flue towards the fire base (or the bottom of the firebox), the combustion gases are required to travel down and across to the mouth of the flue in order to enter the flue. This has the effect of drawing the combustion gases across the charcoal/reduction layer, thus enhancing the further reduction of volatiles and steam to combustible gases such as hydrogen and carbon monoxide. The natural draught (or drawing effect) created by the exhaust flue should be adequate to facilitate this process. Moreover, this means that the lower portion of the exhaust flue therefore helps to create and/or fuel the secondary combustion zone at (or adjacent) its opening.

Preferably, the combustion system may include a drying zone for drying the biomass fuel and/or removing water from the biomass fuel prior to the pyrolysis and/or combustion of the fuel.

In the embodiment where the fireplace is a wood burner, the drying zone may be situated above the primary combustion zone. That is, biomass fuel may be introduced above the primary combustion zone in an area that forms, and serves, as a drying zone. Provision for introducing biomass fuel may, for example, be provided via a hinged door at the top or front of the wood burner.

It is also envisaged that the drying zone may be included within, or comprise part of, the primary combustion zone.

Preferably, the combustion system may include a first air supply means for supplying air to the primary combustion zone or to the fireplace generally.

In the case of a masonry or open fireplace, the first air supply means may simply be provided for by the surrounding air.

In the case of a wood burner, the first air supply means may be provided by an air duct leading into the wood burner. The amount of air that may be permitted to enter the wood burner may be adjustable, for example by the operation of an air damper lever with respect to an air valve.

Preferably, the combustion system may further include a second air supply means for introducing super heated air into the region of the secondary combustion zone.

In one embodiment, the second air supply means may be in the form of a secondary flue, partially or wholly surrounding the lower portion of exhaust flue.

For example, this may be facilitated by placing a piece of larger section or diameter flue around the lower portion of the main exhaust flue, leaving an air gap in between. The air gap created between the secondary flue and the lower portion of the exhaust flue may serve to take air from the top of the firebox (in the case of a wood burner) and channel it down to the secondary combustion zone at the base of the lower portion of the exhaust flue. The air travelling through this air gap may be super heated by the exhausting flue gases within the lower portion of the exhaust flue on one side, and the primary combustion zone on the other side.

Furthermore, the primary combustion zone may derive benefit by a much increased flame path as the flames are drawn down the air gap from the top of the firebox, thus maintaining a high temperature and increasing the time available to fully burn in.

In an alternative embodiment of the invention, the second air supply means may include an air channel which penetrates the outside of the exhaust flue and extends downwards towards the bottom of the lower portion of the exhaust flue and/or in the region of the secondary combustion zone.

In such an embodiment, it may be preferable to create an aperture in the exhaust flue at a point just above the top of the firebox of the wood burner. An air channel may then be inserted through this aperture and downwards to the secondary combustion zone at the lower portion of the main exhaust flue.

In yet another embodiment, the fire base of a wood burner may be provided with a grate and the grate may include (or be comprised of) a plurality of hollow tubes, the arrangement and construction being such that these hollow tubes form part of the second air supply means for introducing super heated air into the region of the secondary combustion zone.

It is also envisaged that one or more of the above embodiments for providing for a second air supply means may be present in any one combustion system and/or wood burner.

Preferably, the combustion system may include insulation means for insulating the region of the secondary combustion zone.

One purpose of the insulation means may be to maximise temperatures within the secondary combustion zone.

An example of a suitable insulation means would be a block of a heat resistant and/or insulative material, such as a high thermal resistant ceramic material.

Preferably, the insulation means may also serve to introduce a degree of air turbulence or mixing into the secondary combustion zone. The introduction of a degree of turbulence into the secondary combustion zone may serve to enhance the levels of combustion and/or temperatures of combustion.

In the case of a wood burner, the inside of the firebox may also be lined with an insulative material, such as a ceramic material, in order to maximise heat within the primary combustion zone and/or the wood burner. In such an arrangement, the ceramic material may be contoured or shaped so as to minimise any dead air zones within the firebox and/or maximise overall air flows within the firebox.

It may also be appreciated that the secondary combustion zone is surrounded by, and therefore also insulated by, the primary combustion zone. This enables very high combustion temperatures to be attained, and maintained, in the region of the secondary combustion zone.

It is envisaged that the invention may be retrofitted to existing fireplaces by making appropriate modifications, or alternatively, the invention may be incorporated into new fireplaces.

PREFERRED EMBODIMENTS

The description of a preferred form of the invention to be provided herein, with reference to the accompanying drawings, is given purely by way of example and is not to be taken in any way as limiting the scope or extent of the invention.

DESCRIPTION OF PREFERRED EMBODIMENTS

Figure 1:
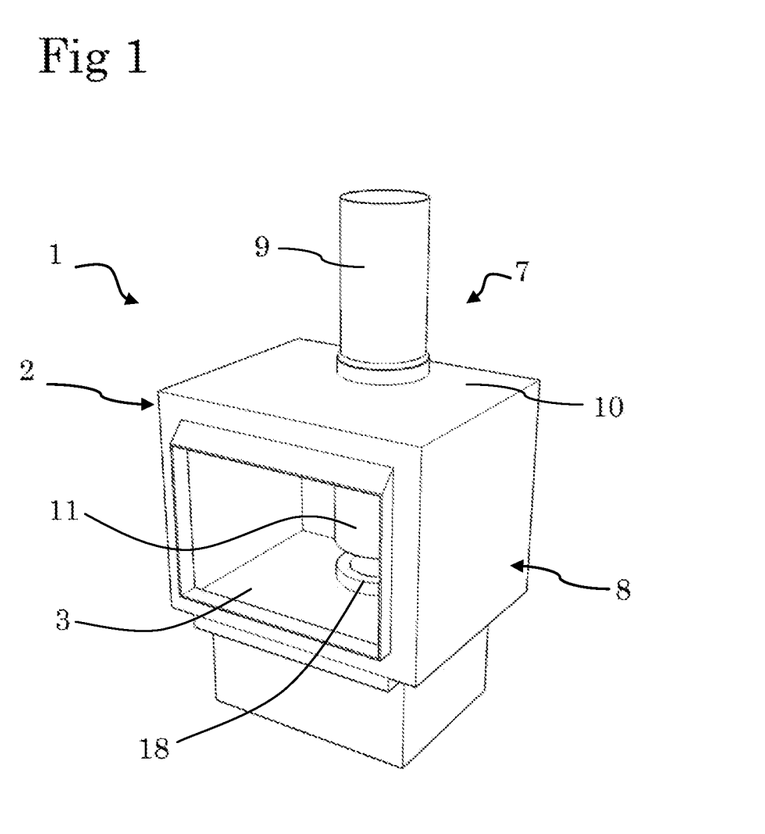
FIG. 1: is a perspective front view of a wood burner which incorporates one possible embodiment of the present invention.
Figure 2:
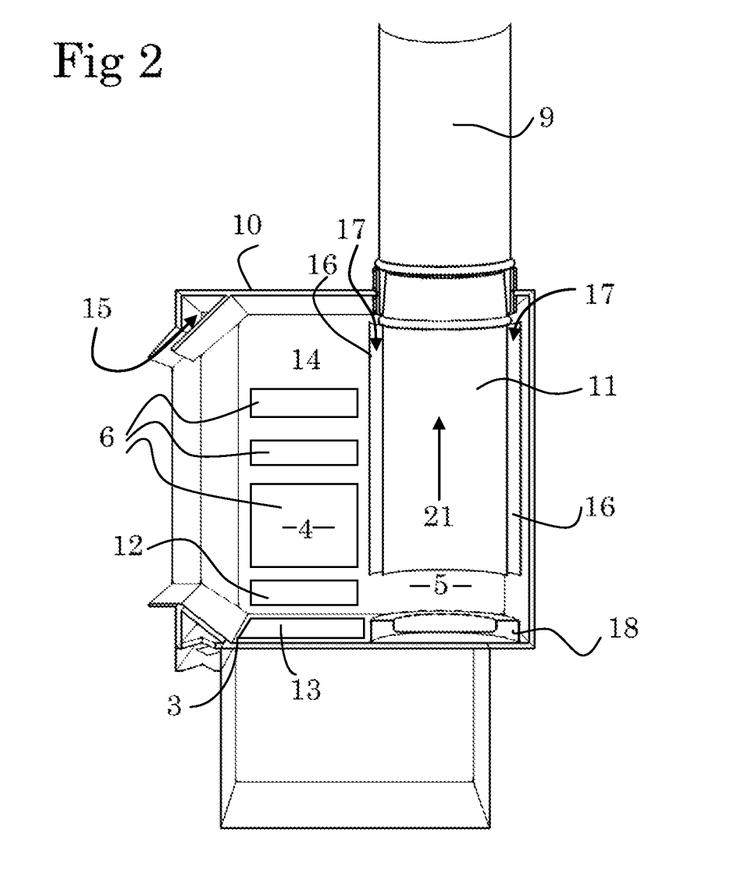
FIG. 2: is a cut-away side view of the embodiment illustrated in FIG. 1, FIG. 3: is a cut-away side perspective view of another possible embodiment of the present invention.

Having regard to FIGS. 1 and 2 there is shown a combustion system generally indicated by arrow 1.

The combustion system 1 includes a fireplace in the form of a wood burner 2.

The wood burner 2 includes a metal firebox 8 and an adjustable air intake control (not shown). The firebox 8 includes a fire base 3, which effectively forms the floor of the firebox 8 of the wood burner 2.

The wood burner 2 also includes a primary combustion zone 4 for pyrolysing and/or combusting wood 6, and a secondary combustion zone 5 for combusting gases and/or particulate matter produced from the pyrolysis and/or combustion of the wood 6.

The wood burner 2 also includes an exhaust flue, generally indicated by arrow 7.

The upper part 9 of the exhaust flue 7 extends out of the top 10 of the firebox 8 and ultimately extends up and out through the ceiling and roof of the dwelling in which the wood burner 2 is housed.

The lower part 11 of the exhaust flue 7 extends into the firebox 8 to a position near to, or adjacent, the secondary combustion zone 5 (or fire base 3). This results in the downdraft or side draft of the combustion gases and/or particulate material. That is, the combustion gases and/or particulate material have to work their way downwards from the inside of the firebox 8 in order to be able to enter the open end of the lower part 11 of the exhaust flue 7. This downdraft (or side draft) is primarily facilitated by the updraft created as hot air (or gases) ultimately travel up the flue 7 on their way to being exhausted through a roof or ceiling (that is, in the direction of arrow 21).

The lower part 11 of the exhaust flue 7 may be retrofitted to existing wood burners 2.

For example, the lower part 11 of the exhaust flue 7 may be inserted into the firebox 8 and crimped onto the lower portion of the upper part 9 of the exhaust flue 7. Alternatively, the lower part 11 of the exhaust flue 7 may be slid into the bottom of the upper part 9 of the exhaust flue 7.

An advantage of such an arrangement is that the combustion system 1 may therefore effectively be retrofitted to existing wood burners 2, thus bringing them up to modern compliance standards.

Furthermore, the task of retrofitting to existing wood burners 2, as described above, is a relatively simple, quick and inexpensive operation.

Alternatively, the lower part 11 of the exhaust flue 7 may be incorporated into new wood burners 2.

The combustion system 1, when in operation, results in a charcoal/reduction layer 12 forming below the primary combustion zone 4, and between the primary combustion zone 4 and the secondary combustion zone 5. The arrangement and construction is such that the gases and/or particulate matter produced from the pyrolysis and/or combustion of the wood in the primary combustion zone 4 have to pass over the charcoal/reduction layer 12 prior to entering the secondary combustion zone 5 and/or the exhaust flue 11.

The combustion system 1, when in operation, also results in an ash layer 13 forming on the fire base 3 below the primary combustion zone 4 and charcoal/reduction layer 12.

The wood burner 2 also includes a drying zone 14 for drying the wood 6 and/or removing water from the wood 6 prior to the pyrolysis and/or combustion of the wood 6. The drying zone 14 is situated above (or within) the primary combustion zone 4. Provision for introducing wood 6 to the wood burner 2 is via a hinged door (not shown) at the front of the firebox 8.

The wood burner 2 includes a first air supply means 15 in the form of an adjustable air damper (not shown). The first air supply means 15 serves to provide an air supply to the interior of the firebox 8, and more particularly to the primary combustion zone 4.

The wood burner 2 also includes a second air supply means for introducing super heated air into the region of the secondary combustion zone 5.

The second air supply means is provided for by a secondary flue 16 which wholly surrounds the lower part 11 of the exhaust flue 7. This is facilitated by placing the piece of larger secondary flue 16 (175 mm in diameter) around the lower exhaust flue 11 (150 mm in diameter), leaving an air gap 17 of approximately 25 mm therebetween. The air gap 17 serves to take air from the top of the firebox 8 and channel it down through the air gap 17 to the secondary combustion zone 5 at the base of the lower part 11 of the exhaust flue 7. The air travelling through this air gap 17 is super heated by the exhausting flue gases within the lower exhaust flue 11 on one side, and the primary combustion zone 4 on the other side.

Furthermore, the primary combustion zone 4 derives benefit by a much increased flame path as the flames are drawn down the air gap 17 from the top of the firebox 8, thus maintaining a high temperature and increasing the time available to fully burn in.

The combustion system 1 includes insulation means for insulating the region of the secondary combustion zone 5. The insulating means is in the form of a ceramic disc 18.

One purpose of the ceramic disc 18 is to maximise temperatures within the region of the secondary combustion zone 5.

Another purpose of the ceramic disc 18 is to introduce a degree of air turbulence or mixing into the region of the secondary combustion zone 5 which serves to enhance the levels of combustion and/or increase the temperatures of combustion. That is, the presence of the ceramic disk 18 serves to create an air disturbance in the region of the secondary combustion zone 5, and the result may be compared to the act of blowing on a fire to increase its intensity.

It may also be appreciated that the secondary combustion zone 5 is surrounded by, and therefore also insulated by, the primary combustion zone 4, thus resulting in the maintenance of very high combustion temperatures in the region of the secondary combustion zone 5.

The combustion system 1 and/or wood burner 2 may work or be operated as follows:

Firstly, the firebox 8 of the wood burner 2 may be filled with wood 6, and perhaps initially filled with smaller pieces of wood such as kindling, sitting atop paper for ignition purposes.

Once the fire within the firebox 8 has become well established, the wood 6 in the drying zone 14, situated above (or within) the primary combustion zone 4, will rapidly dry out, releasing water vapour in the process. This moisture vapour will in fact become a source of fuel when it is later split into hydrogen and carbon monoxide as it passes over the charcoal/reduction layer 12.

Once the wood 6 has dried out and entered the primary combustion zone 4, it will firstly undergo pyrolysis or combustion to produce predominantly charcoal and tar.

The pyrolysised wood 6 will then undergo combustion to produce predominantly carbon dioxide and water vapour. If enough oxygen is present, the temperature of combustion may also be sufficient to partially consume the charcoal and tar produced from the pyrolysis of the wood 6, however most existing wood burners would not ordinarily be able to produce sufficient heat to be able to do this.

An advantage of the combustion system 1, is that the combustion gases and products of pyrolysis are required to travel down and across to the mouth of the lower flue 11 in order to escape to atmosphere, thus drawing them across the charcoal/reduction layer 12 which greatly enhances the further reduction of the combustion gases, particulate matter and products of pyrolysis to combustible gases. For example, carbon dioxide and water vapour are "reduced" to the more combustible gases of hydrogen and carbon monoxide. The natural draught created by, or adjacent, the lower part 11 of the exhaust flue 7 is adequate to facilitate this process, and one advantage of this process is that it provides for the side draught and/or down draft of the combustion gases and products.

Furthermore, the resultant combustible gases such as hydrogen and carbon monoxide (as well as any other combustion gases and/or particulate materials and/or products of pyrolysis) then pass through the secondary combustion zone 5. The secondary combustion zone 5 includes the provision of an air supply of super heated air which passes down the air gap 17 and into the secondary combustion zone 5 (as described previously).

Tests have shown that sustained temperatures in the region of the secondary combustion zone 5 vary between approximately 1050° C.--1400° C.—compared to approximately 600° C.-800° C. for a conventional wood burner.

A sustained temperature in the region of the secondary combustion zone 5 of approximately 1000° C. or above is usually sufficient to combust both hydrogen and carbon monoxide, thus ensuring that none of these otherwise undesirable gases are exhausted to the atmosphere. My invention therefore clearly reaches these temperatures, and this compares favourably with the prior art appliances referred to previously, which do not appear to reach these kind of temperatures.

Furthermore, tests have shown that the very high temperatures achieved within the secondary combustion zone 5 serve to combust virtually all other gases and/or air pollutants (or smoke) produced by the wood burner 2.

This results in less pollutants being exhausted to the atmosphere generally, and also results in less build up of soot and creosote products on the inside of the exhaust flue 7. For example, testing has shown that these vastly reduced emissions only form very thin white or light grey deposits on the cowl at the top of the flue 7, whereas previously this whole area had been covered in substantive black deposits. It follows therefore that the flue 7 is much less prone to the build up of soot and creosote products, thus reducing maintenance and also reducing the likelihood of chimney fires. Moreover, the unnecessary build up of soot, creosotes or tars within the flue has the detrimental effect of cooling the flue (which this invention minimises or negates).

One way of further reducing the exhausting of particulate matter from the wood burner 2 would be by separating the primary combustion zone 4 and the secondary combustion zone 5, for example with a mesh screen (not shown).

Alternatively, there could be provided a tapered hearth (not shown) between the primary and secondary combustions zones 4,5—which would serve to concentrate the charcoal/reduction layer 12 at the point where the volatile gases and/or particulate material pass from the primary combustion zone 4 to the secondary combustion zone 5.

One of the reasons for the popularity of air-controlled wood burners is that the rate of combustion can be controlled through control of the air intake, or oxygen. However, starving the fire of air results usually results in incomplete combustion and increased pollution. The combustion system 1 uses oxygen, liberated from steam, to help the combustion process, thereby making it less polluting to restrict the air flow into the wood burner 2.

Figure 3:
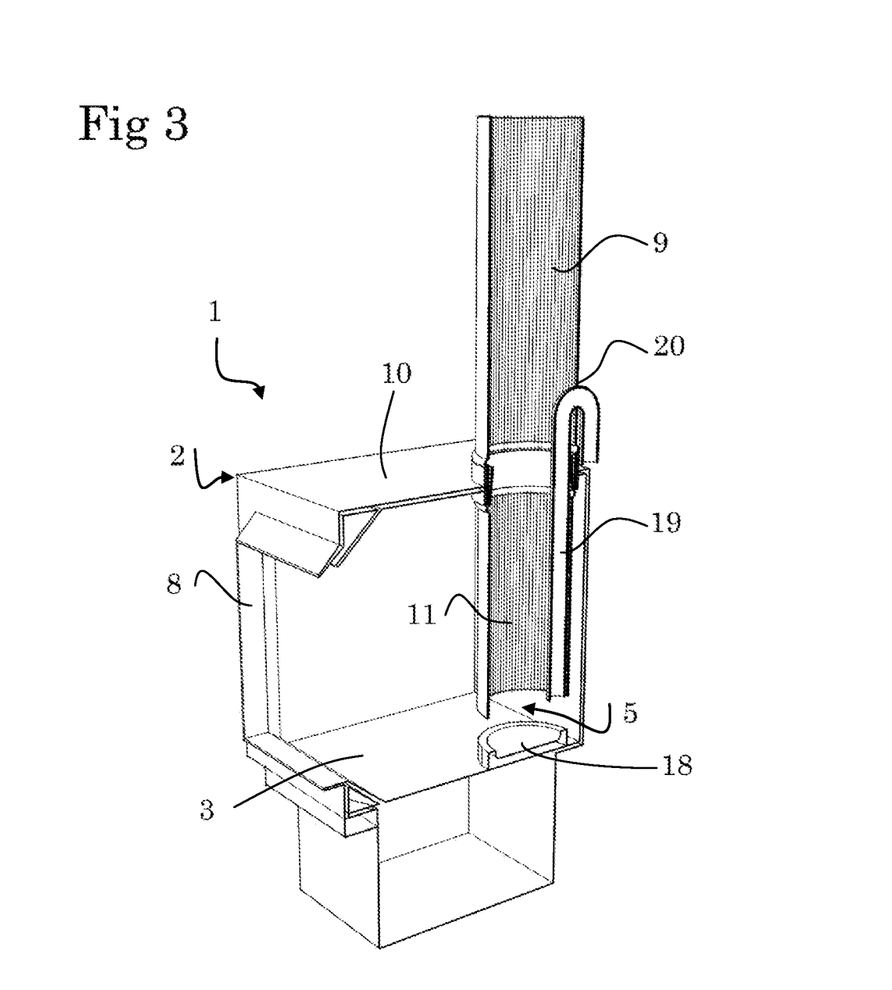

Having regard to FIG. 3, there is shown a cut-away side perspective view of another possible embodiment of the present invention. For convenience, the same numbers are used in FIG. 3 that correspond to the same (or similar) features which are also present in the embodiment described in FIGS. 1 and 2.

FIG. 3 illustrates an alternative embodiment whereby the second air supply means includes an air channel 19 which penetrates the outside of the exhaust flue 7 and extends downwards into the secondary combustion zone 5.

This is achieved by creating an aperture 20 in the side of the exhaust flue 7 at a point just above the firebox 8 of the wood burner 2. The air channel 19 may then be inserted through this aperture 20 and extended downwards into, or adjacent, the secondary combustion zone 5 at the bottom of the lower flue 11. The air travelling through this channel 19 is super heated by the exhausting flue gases within the lower exhaust flue 11- and the channel 19 therefore serves essentially the same purpose as the secondary flue 16 illustrated in FIG. 2.

Figure 4:
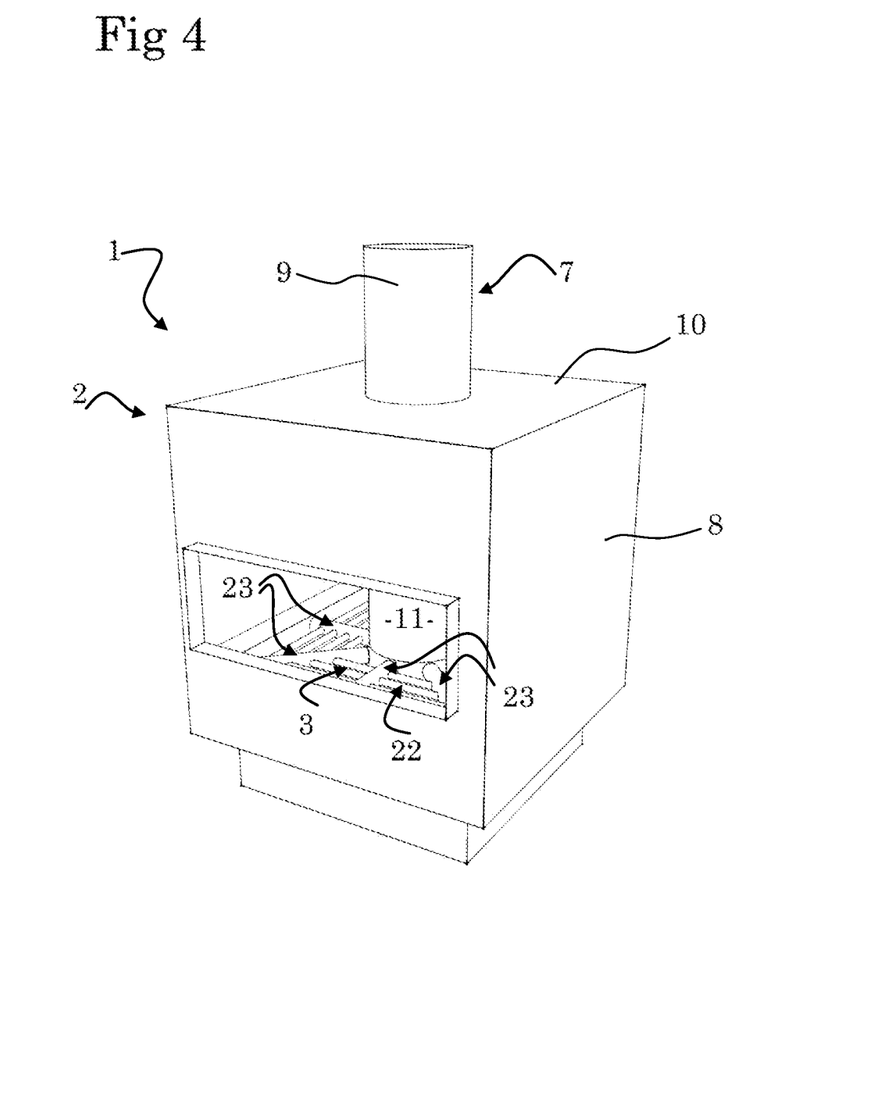
FIG. 4: is a perspective front view of yet another possible embodiment of the present invention.
Figure 5:
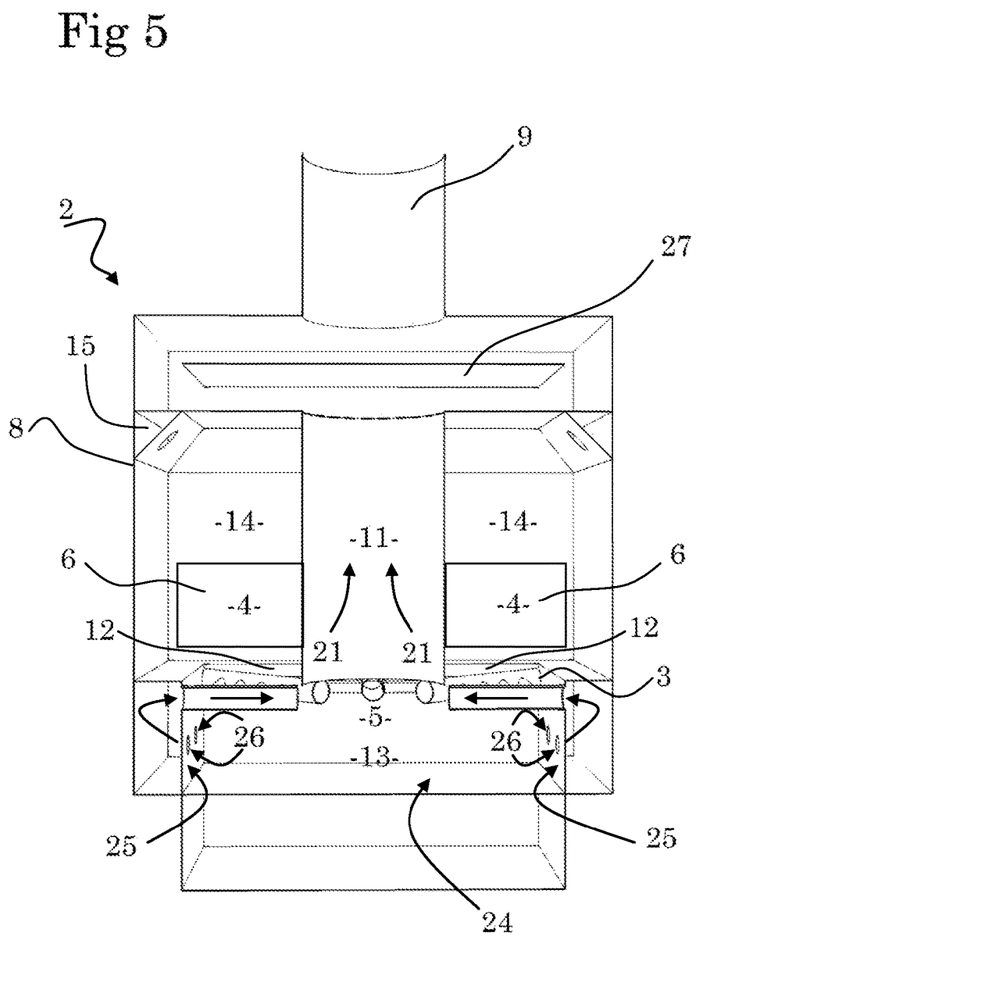
FIG. 5: is a cut-away side view of the embodiment illustrated in FIG. 4.

Having regard to FIGS. 4 and 5, there is shown another possible embodiment of the present invention. Again, and for convenience only, the same numbers are used in FIGS. 4 and 5 that correspond to the same (or similar) features of the invention which are also present in the embodiments described in FIGS. 1, 2 and 3.

Having regard to FIG. 4, there is shown a front perspective view of a wood burner 2. The lower portion 11 of the exhaust flue 7 is centrally located within the firebox 8, and the fire base 3 is in the form of a grate, the grate being generally indicated by arrow 22. Below the grate 22 is an ash pit 24.

The grate 22 is comprised of a number of open-ended hollow tubes 23 which extend from the sides 25 of the ash pit 24 to the region of the secondary combustion zone 5 (formed just below the periphery of the lower portion 11 of the exhaust flue 7).

There are holes 26 formed in the sides 25 of the ash pit 24, and these holes 26 may be drilled or pre-formed in the sides 25. Air is able to flow from the ash pit 24, through the holes 26, and along the hollow tubes 23 to the region of the secondary combustion zone 5. This air flow is indicated by the arrows shown in FIG. 5.

This air flow serves as the second air supply means for introducing super heated air into the region of the secondary combustion zone 5. That is, the air travelling up and along the hollow tubes 23 is super heated by virtue of the heat provided by the charcoal reduction layer 12, which is above the hollow tubes 23. Hence, the secondary combustion zone 5 is heated by both the primary combustion zone 4, the charcoal reduction layer 12 and the super heated air emanating from the ends of the hollow tubes 23.

This differs from the embodiment illustrated in FIGS. 1 and 2 in that the super heated air in FIGS. 1 and 2 is provided through the gap 17 between the secondary flue 16 and the lower portion 11 of the exhaust flue 7. The embodiment illustrated in FIGS. 4 and 5 does away with the secondary flue 16 and instead utilises the air flow through the hollow tubes 23, as indicated in FIG. 5, to produce essentially the same result.

The wood burner of FIGS. 4 and 5 also includes a baffle 27. The baffle 27 is designed to lengthen the flame path and slow the velocity of the gases and/or particulate matter, whereby there is more time for any gases to be combusted and/or whereby any particulate matter may drop back down to be properly combusted.

VARIATIONS

While the embodiments described above are currently preferred, it will be appreciated that a wide range of other variations might also be made within the general spirit and scope of the invention and/or as defined by the appended claims.

I claim:

1. A combustion system, said combustion system including:
   a) a biomass burner, said biomass burner including:
      i) a firebox,
      ii) a fire base at, or forming, the bottom of the firebox,
      iii) a primary combustion zone for pyrolyzing or combusting a biomass fuel, the primary combustion zone being located within an interior of the firebox, iv) a first air supply arranged to supply air to the primary combustion zone, v) a secondary combustion zone for combusting gases or particulate matter produced from the pyrolysis or combustion of the biomass fuel, the secondary combustion zone being located adjacent the fire base, b) an exhaust flue, a lower portion of the exhaust flue extending within the interior of the firebox to an upper portion of the firebox and out of the firebox, the lower portion of the exhaust flue having a lowermost perimeter that defines an inlet of the exhaust flue, the lowermost perimeter being located at a position adjacent to said fire base and above said secondary combustion zone, wherein exhausting flue gases travel within the lower portion of the exhaust flue and along an inner surface of the exhaust flue, and c) a secondary flue which wholly surrounds the lower portion of the exhaust flue, the secondary flue having a lower perimeter wholly surrounding the lowermost perimeter of the lower portion of the exhaust flue and defining therebetween an air channel that extends downward to and exits to an upper part of said secondary combustion zone, the air channel providing an air gap between an outer surface of the lower portion of the exhaust flue and an inner surface of the secondary flue, the air gap defining a second air supply providing a downwardly directed air path from the upper portion of the firebox to source air from within the upper portion of the firebox and channel the air sourced from within the upper portion of the firebox downwardly through the air gap to exit to the upper part of the secondary combustion zone, wherein, the exhausting flue gases traveling within the lower portion of the exhaust flue and along an entire circumference of the interior side of the exhaust flue heat the air of the second air supply travelling downwardly through the air gap along the exterior side of the exhaust flue.

2. The combustion system, as claimed in claim 1, wherein said combustion system further includes, or results in, a charcoal/reduction layer forming below the primary combustion zone, or between the primary combustion zone and the secondary combustion zone, the combustion system configured such that gases or particulate matter produced from the pyrolysis or combustion of the biomass fuel in the primary combustion zone have to pass over or through said charcoal/reduction layer prior to entering the secondary combustion zone or the lower portion of the exhaust flue.

3. The combustion system, as claimed in claim 2, wherein said combustion system includes a drying zone for drying the biomass fuel or removing water from the biomass fuel prior to the pyrolysis or combustion of the fuel.

4. The combustion system, as claimed in claim 2, wherein the combustion system further includes insulation insulating the region of the secondary combustion zone.

5. The combustion system, as claimed in claim 1, wherein said combustion system includes a drying zone for drying the biomass fuel or removing water from the biomass fuel prior to the pyrolysis or combustion of the fuel.

6. The combustion system, as claimed in claim 5, wherein the combustion system further includes insulation insulating the region of the secondary combustion zone.

7. The combustion system, as claimed in claim 1, wherein the combustion system further includes insulation insulating the region of the secondary combustion zone.

8. The combustion system, as claimed in claim 7, wherein said insulation is arranged to introduce a degree of air turbulence or mixing into the region of the secondary combustion zone.

9. The combustion system, as claimed in claim 7, wherein said insulation comprises a ceramic disc.

10. The combustion system, as claimed in claim 1, wherein said combustion system is configured to be retrofitted to an existing wood burner.

11. The combustion system, as claimed in claim 1, wherein the air gap is 25 mm between the outer surface of the exhaust flue and the inner surface of the secondary flue.

* * * * *